L. McCORMICK.
ILLUSION DEVICE.
APPLICATION FILED FEB. 19, 1913.

1,079,902.

Patented Nov. 25, 1913.

2 SHEETS—SHEET 1.

WITNESSES

INVENTOR
Langdon McCormick
BY
Pennie Davis Eldsborough
ATTORNEYS

L. McCORMICK.
ILLUSION DEVICE.
APPLICATION FILED FEB. 19, 1913.
1,079,902.
Patented Nov. 25, 1913.
2 SHEETS—SHEET 2.
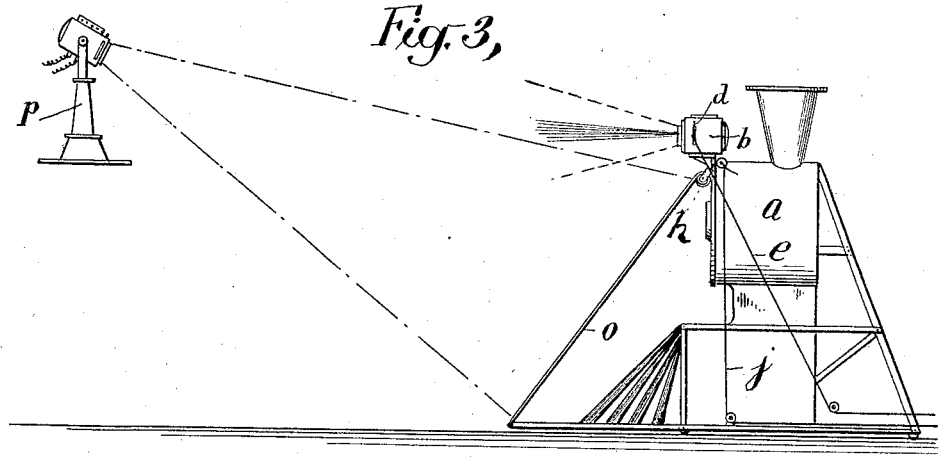
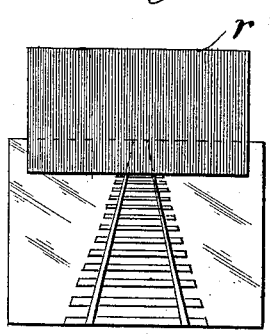
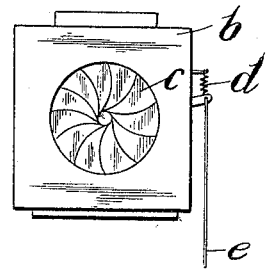
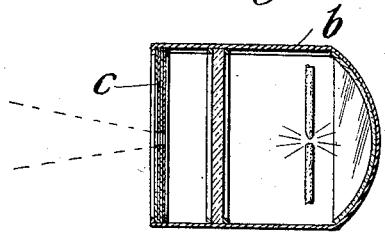
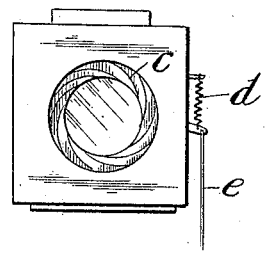
WITNESSES
INVENTOR
Langdon McCormick
BY
ATTORNEYS

UNITED STATES PATENT OFFICE.

LANGDON McCORMICK, OF NEW YORK, N. Y., ASSIGNOR TO THURSTON-McCORMICK CO., INC., OF NEW YORK, N. Y., A CORPORATION OF NEW YORK.

ILLUSION DEVICE.

1,079,902.  Specification of Letters Patent.  Patented Nov. 25, 1913.

Application filed February 19, 1913. Serial No. 749,357.

*To all whom it may concern:*

Be it known that I, LANGDON McCORMICK, a citizen of the United States, and resident of the city of New York, N. Y., have invented certain new and useful Improvements in Illusion Devices; and I do hereby declare the following to be a full, clear, and exact description of the invention, such as will enable others skilled in the art to which it appertains to make and use the same.

The invention relates to the production of the illusion of approach or recession of an observed object, and is applicable to scenic effects in theaters, to advertising purposes, and generally, wherever it is desired to produce such an illusion. For this purpose I associate with the observed thing, or with a suitable representation thereof, the representation of a road, course or way in perspective, and make provision for progressively obscuring or blotting out the perspective representation, beginning at the distant end, to give the illusion of approach of the object; or for progressively revealing the perspective representation of the road, course or way, beginning with the near end, to give the illusion of recession of the object. Wherever necessary or advisable, I provide a progressively changeable representation of the observed object suitable to coöperate with the perspective representation in creating and sustaining the illusion.

For the representation of the observed object, as well as for the perspective representation of the road, course or way, I may employ scenic structures, paintings on curtains, lights, images thrown on curtains by projecting lanterns, shadow effects, or combinations of these things; as will be more fully understood from the following description and accompanying drawings.

By way of example, I have illustrated two specific embodiments of the invention as applied to the creation of the illusion of an approaching locomotive, and from these it will be understood how the invention may be applied to the creation of all sorts of illusions of approaching and receding objects.

Figure 1:
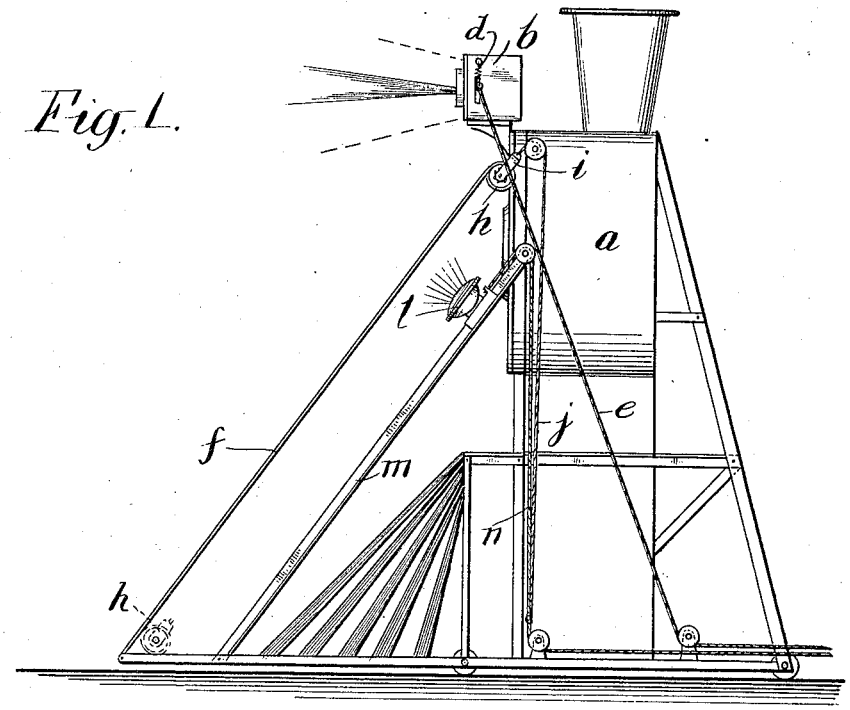
Figure 2:
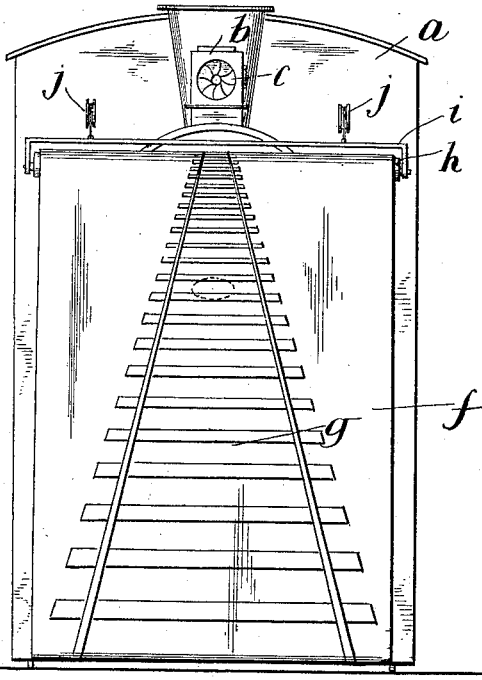

Figure 1 shows in side elevation, a scenic representation of a locomotive, associated with a representation of a railway in perspective, painted on a curtain; Fig. 2 is a front view of the same, showing the perspective representation fully revealed; Fig. 3 shows in side elevation a modification in which the perspective representation is thrown on a screen by a projecting lantern; Fig. 4 illustrates the action of the lantern shutter in obscuring the perspective representation; Figs. 5 and 6 illustrate two positions of the head light of the locomotive; and Fig. 7 is a central longitudinal section through the head light.

Referring to Figs. 1 and 2, the scenic representation $a$ of a locomotive carries at its upper portion a head light or lantern $b$ in the usual position. This lantern has an iris diaphragm $c$ of the usual construction (see Figs. 5, 6 and 7) which is moved to the closed position by the spring $d$, and may be opened, to progressively increase the visible extent of the light, by a cord $e$. In front of the scenic representation is arranged a curtain $f$ which, in the embodiment of the invention here illustrated, bears a translucent representation of a railway in perspective, as indicated at $g$. Such a representation or transparency may be made, for example, by painting the tracks and ties with oil, or oil paints, on a canvas curtain. The lower end of the curtain $f$ may be attached to the lower part of the scenic representation or to the floor, and its upper end is attached to a spring roller $h$ carried by the yoke or holder $i$, to which are connected the cords $j$ running over suitable pulleys, and serving to raise and lower the curtain. For the purpose of making the translucent trackway visible, a lamp $l$, giving a suitable diffused light is arranged behind the curtain, and by mounting this lamp to slide on a suitable guide-way, as $m$ and controlling it by a cord, as $n$, the lamp may be caused to move up and down with the spring roller, thereby always illuminating the perspective representation at the top of the visible portion thereof, and creating the effect of an illumination of the track, such as is caused by the head light of a locomotive.

The mode of operation of the device will be clear. The curtain being in the position shown in Figs. 1 and 2, illuminated from the rear by the lamp *l* and with dim lights on the stage and the like, the track way will appear with the small head light at a great distance. By properly manipulating the cords *e*, *j* and *n*, the curtain is progressively removed from the top down, thereby progressively obscuring the perspective representation of the trackway until the roller *h* finally reaches the position shown in dotted lines in Fig. 1; the visible extent of the head light is simultaneously increased, and if desired, the lamp *l* is lowered to continually accentuate the illumination of the track at the distant end of the perspective. As the curtain finally disappears, the theater lights will be manipulated to accentuate the scenic representation of the locomotive, which has, up to this time, been represented by the head light, and of course the necessary noise making accessories may be provided to aid the optical illusion by like appeal to the sense of hearing. To create the illusion of recession of the observed object, it is only necessary to reverse the operation, as will at once be understood.

It will be obvious that the perspective representation of the road track or way may be established in a multitude of ways. In the arrangement shown in Fig. 3, for example, the representation is thrown on the curtain *o* by the projection lantern *p*, the shutter *r* (see Fig. 4) being provided for the purpose of progressively obscuring and revealing the perspective representation. The cloth curtain may be replaced by a representation made up of slats of board or card-board, or the representation may be established by lights behind or taking place of the curtain and which are progressively extinguished or lighted to produce the desired effects, and so on.

What I claim is:

1. A device for association with an observed object or with a representation thereof to create the impression of approach or recession of the object, comprising a perspective representation of a road, course or way, and mechanism for progressively changing the visible extent of the perspective representation, substantially as and for the purpose described.

2. A device for creating the illusion of approach or recession of an observed object, comprising a progressively variable representation of the object, a perspective representation of a road, course or way associated therewith, and mechanism for actuating the progressively variable representation of the object and simultaneously varying the visible extent of the perspective representation of the road, course or way to create and sustain the desired illusion; substantially as described.

3. A device for creating the illusion of approach of a locomotive or the like, comprising a head light, a perspective representation of a road, course or way associated with the head light, and mechanism for progressively obscuring the perspective representation of the road, course or way and simultaneously and progressively increasing the visible extent of the head light to create and sustain the illusion of approach of the locomotive or the like; substantially as described.

4. A device for creating the illusion of approach of a locomotive or the like, comprising a scenic representation of the front of the locomotive or the like, a head light carried thereby, a curtain bearing a perspective representation of a road, course or way beneath the head light and concealing the scenic representation, and mechanism for progressively removing the curtain from the top down and for simultaneously and progressively increasing the visible extent of the head-light; substantially as described.

5. A device for creating the illusion of approach of a locomotive or the like, comprising a scenic representation of the front of the locomotive or the like, a head light carried thereby, a curtain bearing a perspective representation of a road, course or way, beneath the head light, and concealing the scenic representation, mechanism for progressively removing the curtain from the top down and for simultaneously and progressively increasing the visible extent of the head light, and means for continually accentuating the illumination of the upper visible portion of the perspective representation; substantially as described.

6. In a device for the purpose described, a curtain bearing a perspective representation of a road, course or way, a spring roller to which the upper end of the curtain is fastened, a holder for the roller, and cords for raising and lowering the holder; substantially as described.

7. In a device for the purpose described, a curtain bearing a perspective representation of a road, course or way, a light above the curtain at the end of the perspective, and mechanism for progressively but oppositely varying the visible extent of the perspective representation and of the light; substantially as described.

8. In a device for the purpose described, a scenic representation of an object with respect to which the illusion of approach or recession is to be created, a curtain before the scenic representation and bearing a perspective representation of a road, course or way, a light supported above the curtain and at the end of the perspective, and mechanism for simultaneouly and progressively removing the curtain from the top down and increasing the visible extent of the light, or for simultaneously and progressively moving the curtain from the bottom up and decreasing the visible extent of the light; substantially as described.

In testimony whereof I affix my signature, in presence of two witnesses.

LANGDON McCORMICK.

Witnesses:
　THOMAS F. MACMAHON,
　IRVING JAFFIE.

Copies of this patent may be obtained for five cents each, by addressing the "Commissioner of Patents, Washington, D. C."